J. SPEAR.
Cooking Stove.
No. 2,372. Reissued Oct. 9, 1866.
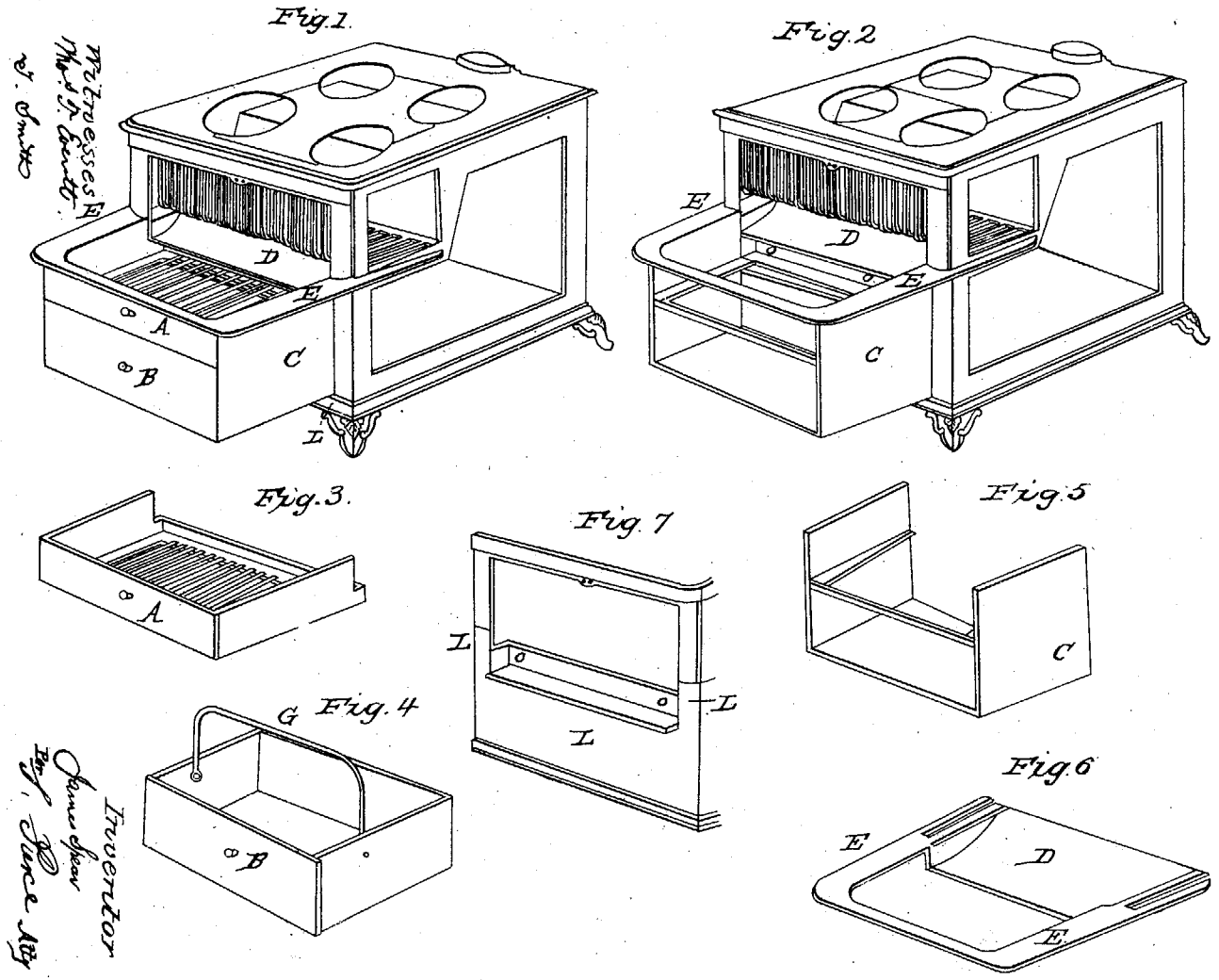
N. PETERS, Photo-Lithographer, Washington, D. C.

UNITED STATES PATENT OFFICE.

JAMES SPEAR, OF PHILADELPHIA, PENNSYLVANIA.

IMPROVEMENT IN COOKING-STOVES.

Specification forming part of Letters Patent No. 31,489, dated February 19, 1861; Reissue No. 2,372, dated October 9, 1866.

DIVISION A.

*To all whom it may concern:*

Be it known that I, JAMES SPEAR, of the city and county of Philadelphia, and State of Pennsylvania, have invented a new and useful Improvement in Cooking Stoves and Ranges; and I do hereby declare that the following is a full, clear, and exact description of the construction and operation of the same, reference being had to the annexed drawings, making a part of this specification, in which—

Figure 1 is a perspective view of the stove, containing the sifting-pan and the ash drawer or reservoir, with the hearth-plate and fire-doors removed. Fig. 2 is a perspective view with the sifting-pan and ash-drawer removed; Fig. 3, the sifting-pan; Fig. 4, the ash drawer or reservoir; Fig. 5, the box or receptacle for the sifting-pan and the ash-drawer; Fig. 6, the hearth-plate of the stove, with the curved or guide plate D attached; Fig. 7, the front plate of the stove, with the hearth-plate and box or frame C removed.

The nature of my invention consists in providing a cooking stove or range with a sifting-pan in the hearth, in order to sift the ashes as they are raked from the grate or fire-chamber; and, also, in placing a large drawer or reservoir under the sifting-pan, in order to contain the sifted ashes; and, also, in so constructing the hearth of a stove or range as to enable those using it to remove both the sifted coal and ashes, or either of them, from the hearth of the stove or range without the use of a shovel, thus avoiding all the dust and dirt attending the removal of the ashes in an ordinary stove or range.

It is a well-known fact to all persons using cooking stoves and ranges that there is a great deal of trouble and annoyance from dust attending the removal of the ashes from the ordinary stove or range, and in all cases they have to be removed by means of a shovel from the hearth to a bucket or other vessel, in order to be conveyed from the stove or range. At the same time both the ashes and unburned coal are removed together, which require to be sifted; otherwise a large quantity of fuel is wasted during a year.

To prevent this evil I have constructed the hearth of a cooking stove or range with a sifting-pan, A, by which means the ashes are sifted and fall into a large ash-drawer, B, placed under the sifting-pan A, as will be seen in Fig. 1. In order to accomplish this I have attached a box or frame, C, to the under side of the hearth E of the stove, on a line with the bottom plate, L, as will be seen in Fig. 2, so that either pan with its contents may be removed without the other.

To enable others skilled in the arts to make and use my invention, I will proceed to describe more fully its construction and operation.

Take any of the well-kown large-oven flat-top cooking-stoves with the elevated hearth—viz., "The Sea-Shell Cook-Stove," the "Continental Cook-Stove," "The William Penn Cooking-Stove," "The New World Cooking-Stove," the "Prairie Flower," the "Conquest," or any of that class of cooking-stoves—and remove the bottom of the hearth or ash-pit, and in place thereof attach a box or frame, C, Fig. 5, to the under side of the hearth, as is shown in Figs. 1 and 2, extending the curved or guide plate D of the hearth-plate so that it will overlap the end of the sifting-pan A, forming a recess, O O, under the guide-plate D for the end of the sifting-pan A, as is shown in Fig. 2.

In Fig. 3 the bottom of the sifting-pan is made of bars, and may be made either of wrought or cast iron.

In Fig. 4 the ash drawer or reservoir is made of sheet-iron of suitable thickness, and is supplied with a bail, G, for greater ease in removing it from the stove when filled.

Fig. 6 is the hearth of the stove, showing the curved or guide plate attached.

Fig. 7 shows the front plate of the stove with the hearth-plate E and box C removed, showing the recess for the end of the sifting-pan A.

I am well aware that grates have been used in stoves and ranges for the purpose of sifting the ashes; but this, simply, I do not claim.

I claim—

The combination of the sifting and ash drawer A and B with the curved or guide plate D, when used in connection with a stove or range in which the oven extends under the fire-grate.

JAMES SPEAR.

Witnesses:
C. SPEAR,
THEO. K. VOGEL.